United States Patent [19]

Christopherson

[11] Patent Number: 4,736,931
[45] Date of Patent: Apr. 12, 1988

[54] DAMPENING SHOCK ABSORBER

[76] Inventor: Rollin F. Christopherson, 5756 S. Willowwood La., South Ogden, Utah 84403

[21] Appl. No.: 914,982

[22] Filed: Oct. 3, 1986

[51] Int. Cl.⁴ .................. B60G 11/56; F16F 5/00; F16F 9/00
[52] U.S. Cl. .................. 267/34; 267/64.26; 188/322.19
[58] Field of Search .............. 267/8 R, 34, 67, 68, 267/64.11, 64.15, 64.26, 69, 70, 71, 116, 121, 136, 140.3, 141, 169, 170, 176, 175, 171, 177, 217, 286; 16/66, 84; 188/322.19; 114/205, 213, 214; 254/93 R, 93 VA

[56] References Cited

U.S. PATENT DOCUMENTS

| 453,573 | 6/1891 | Beery ........................ 267/176 X |
| 1,177,654 | 4/1916 | Sauveur ..................... 267/177 X |
| 1,317,788 | 10/1919 | Hinsdale ..................... 267/72 X |
| 3,220,717 | 11/1965 | Altherr et al. ................ 267/70 |
| 3,603,575 | 9/1971 | Arlasky ........................ 267/34 |
| 4,405,119 | 9/1983 | Masclet et al. .......... 267/64.26 X |
| 4,521,002 | 6/1985 | Adorjan et al. .............. 267/8 R |

FOREIGN PATENT DOCUMENTS 344191 11/1905 France ....................... 267/177

Primary Examiner—Andres Kashnikow
Assistant Examiner—Robert J. Oberleitner
Attorney, Agent, or Firm—M. Reid Russell

[57] ABSTRACT

A dampening shock absorber for retrofit or original construction with a conventional gas charged or hydraulic shock absorber or strut having an annular sleeve telescoped in sliding engagement over an inner sleeve to provide therewith a spring biasing to return the shock absorber to a null state after a displacing force has been removed therefrom. The spring biasing is provided by a single coil spring that is telescoped over an annular sleeve of that shock absorber that has at least a pair of longitudinal slots removed therefrom, which coil spring ends are maintained between outwardly extending flanges of a pair of sliding retaining clips that are telescoped over the annular sleeve that also include inwardly projecting fingers the fingers each to engage a slot end and extend therebeyond so as to engage an inner side or edge of one of a pair of guide rings that are secured in spaced arrangement around the inner sleeve, the distance between which opposite guide ring inner sides is equal to the longitudinal slot length. The inwardly projecting fingers are thereby in overlapping engagement with the longitudinal slot ends for maintaining retaining clip positioning with the coil spring compressed therebetween, the relationship between which retaining clip fingers, longitudinal slot ends, and guide rings inner sides or edges to provide for sliding movement of the retaining clips towards one another so as to compress the coil spring therebetween when the inner and annular sleeves are telescoped together or pulled apart.

8 Claims, 2 Drawing Sheets

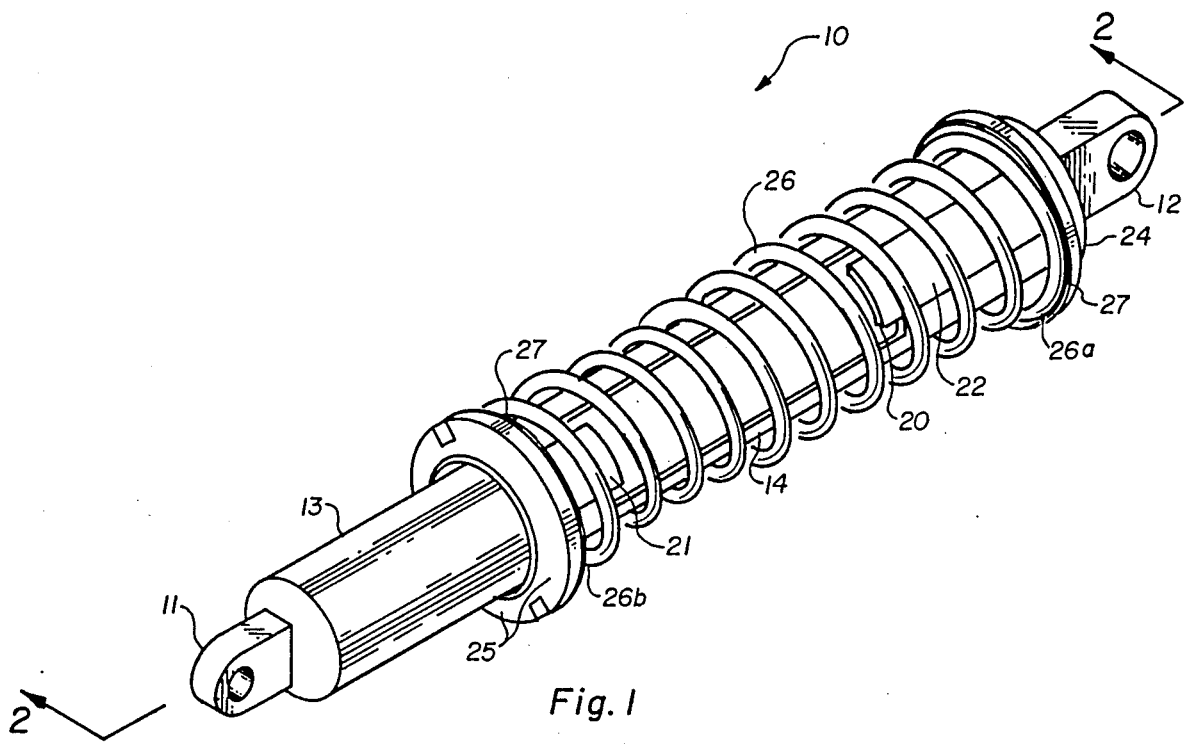
Fig. 1
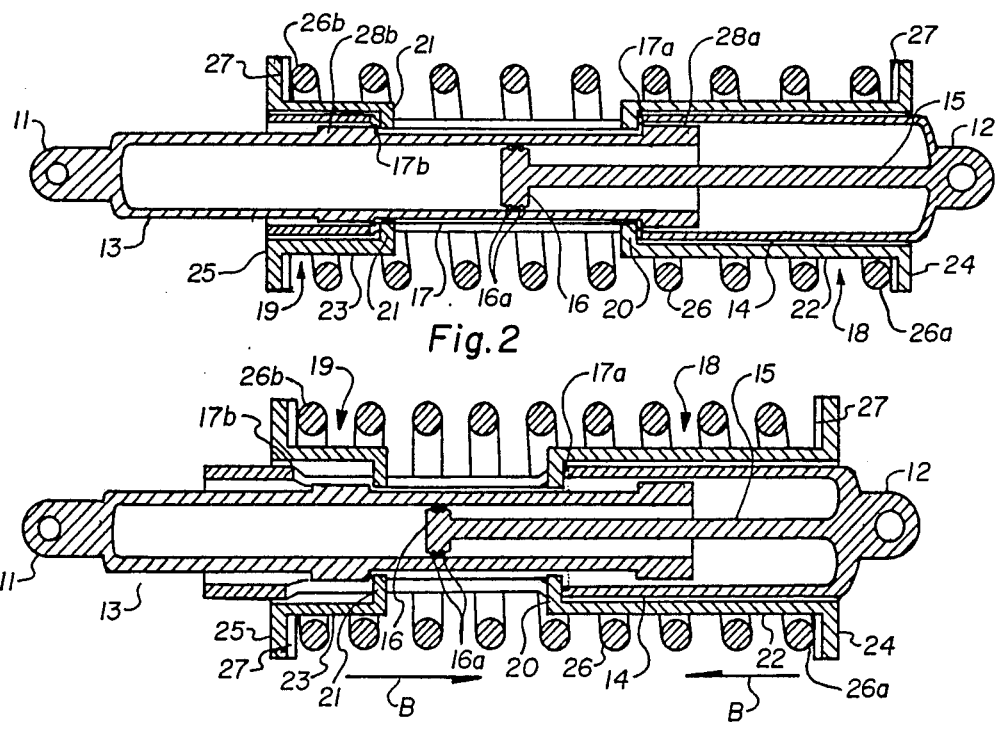
Fig. 2
Fig. 3

DAMPENING SHOCK ABSORBER

BACKGROUND OF THE INVENTION

1. Field Of The Invention

This invention relates to a buffer or dampening arrangement for functioning as a vehicle shock absorber or strut that tends to return to a null attitude when a biasing force is removed therefrom.

2. Prior Art

Heretofore where a vehicle suspension system has been required to support or carry additional or extra weight as when that vehicle is connected to tow a camper, trailer, or like, it has been common to provide a shock absorber for that suspension system that includes a coil spring or like arrangement for acting against that increased load. Such coil spring additions have generally involved telescoping the coil spring around a gas charged or hydraulic shock support between the shock ends to provide a spring loading that is in addition to the gas or hydraulic resistance provided by the shock absorber. Some examples of such spring augmentation of damper systems are shown in patents by R. G. Altherr, et al., U.S. Pat. No. 3,220,717, and by J. W. Wells, U.S. Pat. No. 3,503,601. Additionally such spring augmentation is shown in an old patent by G. H. Chatillon, U.S. Pat. No. 505,092. These patents all show examples of use of a coil spring to augment the carrying capacity of a shock absorber type device. Additionally, for a dynameter, a patent by S. A. Tell, U.S. Pat. No. 3,372,581, shows a use of a coil spring for resisting longitudinal displacement. The Tell spring arrangement also involves a mechanism for adjusting the spring tension. These devices, unlike the present invention, all provide spring arrangements for resisting a load applied to the shock absorber in one direction only. The present invention, with the single spring arrangement, provides a resistance against both compressive and lifting forces as occur when a vehicle supported by such shock absorber is osculated. Distinct therefrom, the present invention utilizing only a single coil spring assembly that tends to hold the vehicle wheel assembly to the frame, functioning similarly to a conventional sway bar assembly to maintain the vehicle unsprung weight and quickly dampen an osculating force applied against that shock absorber.

Finally, a patent by G. E. Kontis, U.S. Pat. No. 4,183,510, shows a single spring arrangement for dampening forces applied to a buffer shock absorber assembly. This device, however, does not involve, as does the present invention, a spring mounting configuration of finger members that extend between spring supports, the finger members to interact with slots formed in telescoped shock absorber sleeves. Rather, the Kontis patent shows an arrangement of interdigited fingers of telescoped sleeves that are functionally and mechanically unlike the present invention.

SUMMARY OF THE INVENTION

It is a principal object of the present invention to provide a dampening shock absorber or strut for a vehicle suspension system arranged to bias the vehicle wheels and axles to the frame, supporting the unsprung weight thereof, that functions similarly to a sway bar system to null out compressive and expansive forces as the vehicle suspension system may experience traveling over the highway.

It is another object of the present invention to provide a spring dampening arrangement that is easily installed to an existing hydraulic or gas charged shock absorber, requiring only minor modifications thereto, the spring arrangement utilizing only a single coil spring for nulling or returning the shock absorber to an unsprung condition to maintain the vehicle body to the suspension system in cornering or where the vehicle experiences a sudden vertical displacement due to the vehicle passing over a bump or obstruction.

It is another object of the present invention to provide a single coil spring dampening arrangement that is easily retrofitted to a conventional gas charged or hydraulic shock absorber, requiring only minimum modification to such shock absorber outer sleeve.

Still another object of the present invention is to provide a spring dampening arrangement for retrofitting to a conventional gas charged or hydraulic shock absorber that provides a capability for adjusting the spring tension of a coil spring thereof to a certain stress or compressive load against a displacement of the vehicle axle, biasing the vehicle body to the axle where the axle is in an unsprung state.

It is another object of the present invention to provide a double acting single spring dampening arrangement for retrofitting to a gas charged or hydraulic strut of shock absorber that is easily and inexpensively retrofitted to that strut or shock absorber.

In accordance with the above objects, the present invention in a double acting dampening shock absorber is an original manufacture of retrofit of a spring assembly to a conventional gas charged or hydraulic shock or strut that involves an annular or outer sleeve that is telescoped over an inner sleeve. The shock absorber annular sleeve including a longitudinally centered piston portion therein that is arranged for travel back and forth within the inner sleeve against a hydraulic or gas resistance. The spring assembly consists of a coil spring arrangement that can be originally manufactured with or is retrofitted to the shock absorber, by first forming at least a pair of longitudinal grooves in the annular sleeve, each groove on an opposite side thereof. The grooves each receive an inwardly projecting boss or finger of a pair of oppositely facing retaining clips. Each retaining clip is formed as a collar that is fitted over an end of the annular sleeve such that the fingers of each retaining clip face one another and accommodate a coil spring telescoped over the annular sleeve that is maintained therebetween. The retaining clips are each arranged to slide independently along the annular sleeve, the opposing fingers thereof to engage, depending upon whether the shock absorber is stretched or compressed longitudinally, an end of one of the longitudinal slots formed in that annular sleeve. When one set of fingers is so engaged, the retaining clip opposite fingers catches an inner edge of one of a pair of spaced apart rings, each of which rings is secured or formed around the inner sleeve, at top and mid points therealong. The distance between the retaining clips is thereby shortened so as to compress the coil spring arranged therebetween, that spring to bias the assembly back to a neutral or null attitude where the retaining clip fingers each engage a slot end.

In practice, when the shock absorber is moved from a null position, one retaining clip finger is in engagement or gripping attitude with the slot end and the other or opposite retaining clip finger is in engagement or gripping attitude with the retaining ring inner edge that is secured around the inner sleeve. So arranged, the coil spring will be compressed between the retaining clips when the shock absorber is subjected to either a compressive or expansive force. The coil spring therefore tends to return the shock absorber back to a neutral or null attitude after such displacing force is removed therefrom.

The present invention provides, with a single coil spring, an assembly for dampening forces, both expansive and compressive, as may be exerted on that shock absorber at the ends thereof. The single spring tends always to return the assembly back to a neutral or null attitude, maintaining the unsprung axle weight and resisting movement of the vehicle body away from or towards the vehicle axle when the vehicle runs over a rock, pothole, or the like.

Additionally, in one embodiment of the invention, the biasing force of the coil spring is arranged to be adjustable by an inclusion of a collar that is arranged around the annular sleeve between a retaining clip and one coil spring end, which collar includes an arrangement for adjusting its spacing distance from the retainer clip, thereby providing for adjusting the compressive force exerted by the coil spring against that collar.

BRIEF DESCRIPTION OF THE DRAWINGS

These and other objects and features of the present invention will become apparent from the following specification taken in conjunction with the accompanying drawings in which:

FIG. 1 is a profile perspective view of the dampening shock absorber of the present invention shown removed from a vehicle between the body and axle thereof;

FIG. 2 is a sectional view taken along the line 2—2 of FIG. 1, showing the shock absorber as a gas charged shock absorber and includes an arrangement of a pair of retaining clips telescoped over the ends thereof and showing a coil spring supported therebetween;

FIG. 3 is a sectional view like that of FIG. 2 only showing a compressive force being exerted on the assembly, ilustrated as arrows A, which force compresses the air contained within an inner sleeve opposite a piston, and shows with arrows B the direction of compression of the coil spring responsive to that movement;

DETAILED DESCRIPTION

Figure 4:
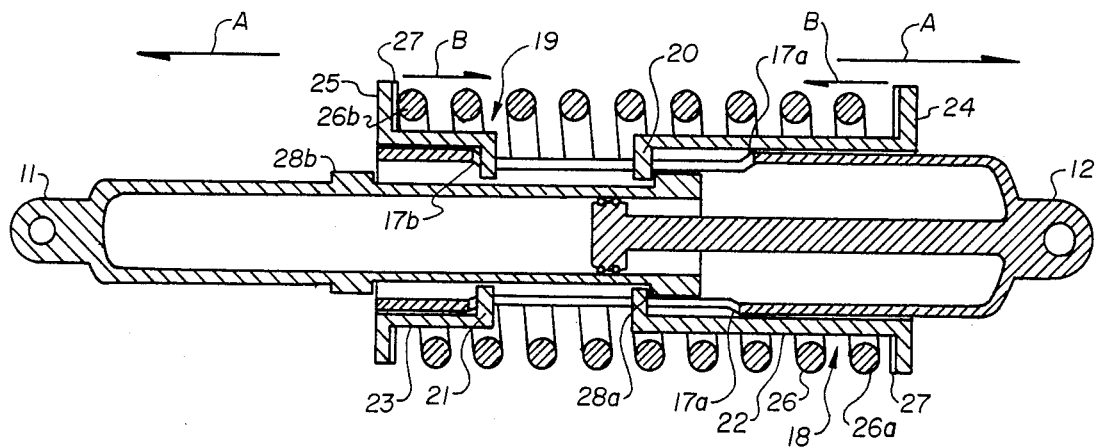
FIG. 4 is a sectional view like FIG. 3 showing, with arrows A, the shock absorber being pulled apart, with arrows B, illustrating that the coil spring is also compressed responsive to that expansive shock absorber movement.

FIG. 1 shows the present invention in a dampening shock absorber 10, hereinafter referred to as shock absorber 10, removed from or before installation to a vehicle as one of at least a pair of shock absorbers. The present invention may be included as a component of either a hydraulic or gas charged shock absorber in the manufacture thereof, or may, as set out herein, be later retrofitted onto such shock absorber. The present invention, to support the vehicle unsprung weight, tends to maintain the positioning of the vehicle chassis or body off from the axle and functions somewhat like a conventional sway bar assembly.

Shock absorber 10, shown in FIG. 1, is particularly useful for stabilizing the vehicle body in cornering, in that it takes the weight off the inside wheel to help the vehicle to maintain a level attitude. Also, when the present invention is installed to a vehicle that is supporting or carrying a rear end load, such as a trailer, it provides a biasing against the vehicle body being pulled downwardly towards the rear axle. Shock absorber 10 therefore functions to maintain the vehicle body in a level attitude with respect to the frame and axles without a sacrifice in the road shock dampening characteristics of a conventional shock absorber or strut. It should, of course, be understood that the term shock absorber, as used herein, also includes struts, and like dampening arrangements.

FIG. 1 shows the shock absorber 10, that is preferably a gas charged shock absorber, as including, on opposite ends thereof, draw bars 11 and 12 that are holed laterally for receiving a pin, or like fastener fitted therethrough when the draw bars are arranged between sides of an axle or frame clevis for pivotally coupling the shock absorber ends between the vehicle body and axle. Draw bar 11, as shown in FIGS. 1 through 5, crowns a closed end of an inner sleeve 13, that has telescoped thereover an outer or annular sleeve 14. The annular sleeve is crowned on a closed end thereof, by draw bar 12, as shown also in FIG. 5. Shown best in FIGS. 2 and 3, the outer or annular sleeve 14 is shown to include a rod 15 centered longitudinally therein that terminates in a piston 16 that is arranged to extend across the inner sleeve interior cavity and includes one or more sealing rings 16a arranged therearound. Piston 16 travels longitudinally within and closes off the inner sleeve 13, with the sealing rings 16a prohibiting gas passage therearound. The trapped air or other gas therein resists piston travel towards the inner sleeve closed end. The described combination of inner and annular sleeves 13 and 14 and piston 16 secured to the end of rod 15 constitutes a standard gas charged shock absorber as is commonly known and marketed.

Figure 5:
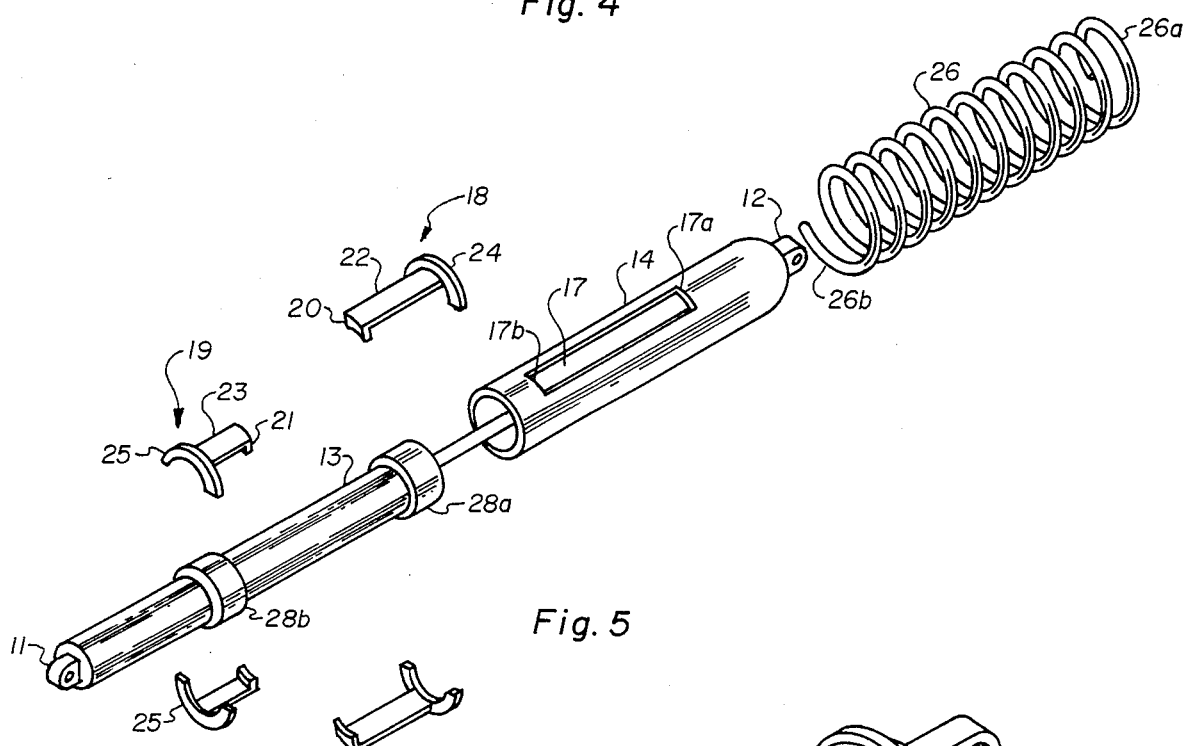
FIG. 5 is an exploded view of the dampening shock absorber of FIG. 1.

The present invention in a shock absorber 10 is shown herein as being retrofitted to the above-described hydraulic or gas charged shock absorber, though it should be understood, the invention could also be an original manufacture. To provide this retrofit, the shock absorber outer or annular sleeve 14 is first modified, as illustrated best in FIG. 5, to include identical longitudinal cavities 17 formed therein. The cavities 17 are exactly aligned across from one another in the annular or outer sleeve 14, and, as will be set out in detail hereinbelow, they have the same length as the spacing distance between outside edges of guide rings 28a and 28b that are formed around the inner sleeve 13. The longitudinal cavities 17 terminate, respectively, in parallel upper and lower ends 17a and 17b, that are exactly aligned with one another across the sleeve, and are each at a normal or right angle to the slot sides. Slot ends 17a and 17b are provided as surfaces for receiving, respectively, a finger or boss end 20 of an upper retaining clip 18 and a finger or boss end 21 of a lower retaining clip 19 fitted thereover. As shown in FIG. 5, each retaining clip 18 and 19 may be formed in two halves that are joined at their ends to encircle the annular sleeve 14 with each including, respectively, an outwardly extending flange 24 and 25. Right angle slide portions 22 and 23 extend from each flange that are arched to conform to the curved surface of the annular sleeve, each opposite slide portion end including an inwardly projecting boss or finger 20 or 21, respectively. So arranged, the outwardly extending flange 24 or 25 projects at right angles outwardly from the plane of the annular sleeve 14 and the boss or fingers 20 or 21 project at right angles inwardly. Each boss or finger 20 or 21 extends through slot 17 to contact the slot end 17a or 17b and to selectively engage a side of an edge of guide ring 28a or 28b, which guide rings are secured in spaced apart relationship around the inner sleeve 13, which space is equal to the slot 17 length.

With the retaining clip halves joined at their ends into retaining clips 18 and 19, as illustrated at FIGS. 1 through 4, the flanges 24 and 25 of each provides surfaces to receive an end 26a or 26b of a coil spring 26 resting thereagainst. The coil spring 26 is shown telescoped over the annular sleeve 14 and is retained between the respective retaining clips 18 and 19, against their flanges 24 and 25. A washer 27 may be sandwiched between the retaining clip flanges 24 and 25, respectively, and the spring ends 26a and 26b, to encircle the annular or outer sleeve 14. As shown best in FIGS. 2 through 4, in the assembled attitude, the respective retaining clips 18 and 19 are telescoped over to slide along the annular sleeve 14 with the spring 26 maintained therebetween. Travel of the retaining clips is, however, restricted by the engagement of the inwardly projecting retaining clip bosses or fingers 20 and 21, respectively. Which retaining clip bosses or fingers 20 and 21, respectively, are fitted to travel in the slots 17 and engage the ends 17a and 17b thereof. The bosses or fingers 20 or 21 are each to extend sufficiently past the respective slot end to engage an outer side or edge of inner sleeve guide ring 28a or 28b, as will be explained hereinbelow in a discussion of the functioning of the invention. So arranged, in compression or extension of the inner and outer sleeves, the coil spring 26 will be compressed between the flanges 24 and 25 of the retaining clips.

In practice, the retaining clips 18 and 19 are formed by joining the halves thereof together, as by welding together the ends thereof, or each retaining clip can be fabricated as a single unit, each to have the outwardly projecting continuous flange 24 or 25, slide portions 22 and 23 and inwardly projecting bosses or fingers 20 and 21. To assemble the shock absorber 10, slots 17 are first appropriately formed in the annular sleeve 14 and guide rings 28a and 28b, if not already a part thereof, are appropriately formed around the inner sleeve 13. Guide ring 28a is installed adjacent to the inner sleeve open end with guide ring 28b installed distal therefrom around the inner sleeve. Guide ring positioning is, as set out above, such that the distance between the inner edges or sides thereof will conform to and equal length of slot 17 which length or spacing governs the initial compressive loading of coil spring 26 in the shock absorber 10 assembly. For a shock absorber known as a Gabriel-Striders TM manufactured by Marmont Corporation, each slot 17 has been cut therein to a width of one and one quarter inches (1¼") and length of four and one half inches (4½"), which length is also the spacing distance between inner surfaces or edges of guide rings 28a and 28b. Accordingly, retainer rings that have slide portions 22 and 23 of four and one half (4½) and one (1) inches, respectively, in length were selected to accommodate a coil spring manufactured by Marmont Corporation, identified as a Load Leveler TM that was shortened for the present application. This arrangement provided a spring compressive loading of approximately twenty five (25) lbs. at neutral to three hundred (300) lbs. at a maximum compressed position.

In an assembled state, coil spring 26, as set out above, is stressed in compression. This is essentially a null or unloaded state of the shock absorber 10, that when mounted in pairs, represents the weight of the wheels, brakes, hub, control arms and axle, which state is shown best in FIG. 2. In the configuration of FIG. 2, the lower retaining clip 19 is first slid over and along the annular sleeve 14 until the boss or finger 21, (the end of which boss or finger may be turned under) on each slide portion 23 engages the slot end 17b, which slot end is also aligned with an inside side or edge of guide ring 28b. Thereafter, coil spring 26 is fitted over annular sleeve 14, the end 26b thereof butting against retaining clip flange 25. Thereafter, the upper retaining clip 18 is fitted over the annular sleeve until the flange 24 thereof engages the coil spring end 26a. Thereafter, continued travel of the upper retaining clip 18 along the annular sleeve compresses coil spring 26 until the bosses or fingers 20 on the ends of each slide portion 22 travel into slot 17. Thereat, by releasing the compressive force exerted on the coil spring 26, the spring end 26a expands against the upper retaining clip flange 24. The bosses or fingers 20 (the ends of which may be turned under) of retaining clip 18 are thereby urged along the slot 17 to engage upper slot end 17a, which slot end is approximately aligned with the inside side or edge of upper guide ring 28a. The assembled shock absorber 10 can be mounted to a vehicle to partially support as one of a pair of such shock absorbers that vehicle chassis or body off of an axle.

In FIG. 2 the shock absorber 10 is shown in an unstressed state, except, of course, that the coil spring 26 is compressed between retaining clip flanges 24 and 25. FIG. 3 shows, with inwardly facing arrows A, a compressive load being exerted on shock abosrber 10. Such force could be a result of the vehicle being hooked to drag or tow another vehicle such as a house trailer, boat trailer, or the like, or could be a compressive force exerted between the vehicle body and axle when the vehicle rolls over a hole or rock in the road. Arrows B in FIG. 2 illustrate the effect of the force represented by arrows A exerted on spring 26. Arrows B are shown pointed towards one another indicating that the response to the force illustrated by arrows A is to compress the coil spring 26. So configured, the shock absorber piston 16 is shown as having moved within the longitudinal cavity of the inner sleeve 13, with the inner and annular sleeves 13 and 14 having further telescoped together. In this attitude, the fingers 20 of the upper retaining clip 18 are shown to have remained in engagement with the end 17a of slot 17 while the guide ring 28a is shown as having moved further into the annular sleeve 14. In this attitude, the fingers 21 of the lower retaining clip 19 will have remained in contact with the inside side of the lower guide ring 28b that encircles the inner sleeve, the fingers 21 having moved off of the slot end 17b as the annular sleeve 14 is further telescoped over the inner sleeve 13. The distance between the retaining clip flanges 24 and 25 is thereby shortened, compressing the coil spring 26, as illustrated in FIG. 3. Upon release of the compressive force, arrows A on the shock absorber 10, the coil spring 26 urges the inner and annular sleeves 13 and 14 back to the attitude shown in FIG. 2.

In FIG. 4, arrows A illustrate an application of a force to extend or pull apart the inner sleeve 13 out of the annular sleeve 14. Shown therein, as the sleeves are pulled apart, the fingers 20 of the upper retaining clip 18 remain in engagement with the side or edge of the upper guide ring 28a as the slot end 17a is moved out of engagement therewith. At the same time, the other guide ring 28b is shown moved out of engagement with the retaining clip fingers 21, which fingers remain in engagement with the slot end 17b. In this configuration, the distance between the retaining clip flanges 24 and 25 has again been shortened so as to compress coil spring 26, as illustrated by arrows B. In either direction of travel of the inner and annular sleeves 13 and 14, therefore, telescoping the inner sleeve into or out of the annular sleeve, the distance between the retaining clips flanges 24 and 25 will be shortened, compressing coil spring 26. The coil spring 26 will then tend to return to its unstressed state, as illustrated in FIGS. 1 and 2, upon removal of the compressive or expansive force exerted thereon. With the spring arrangement of the present invention, a shock absorber with single coil spring 26 provides for nulling all vertical forces applied thereto.

As set out above, the retaining clips 18 and 19 are free to slide along the annular sleeve 14. Where two slots 17, each arranged to receive a pair of oppositely facing fingers 20 or 21 of a retaining clip are shown as preferred, it should be obvious that, within the scope of this disclosure, additional pairs of slots 17 can be formed around that outer or annular sleeve 14, as required. With each such slot to accommodate a pair of fingers attached to slide portions of retaining clip flanges. Additionally, while not shown, within the scope of this disclosure, it should be understood that a spring arrangement other than the coil spring 26 telescoped over the annular sleeve 14 could be employed. Such other spring arrangement could involve individual springs each connected between the closed end of the inner or annular body and the adjacent flange of a retaining clip. Or, a like spring configuration can be used so long as it is arranged to function in tension to return the retaining clip back to its original position, as illustrated in FIG. 2, when a biasing force exerted thereagainst is removed. In such configuration, the spring arrangement would function in tension rather than in compression as has been described in the preferred embodiment of coil spring 26. Such spring arrangement could also involve multiple pairs of springs arranged at spaced intervals around the assembly.

Figure 6:
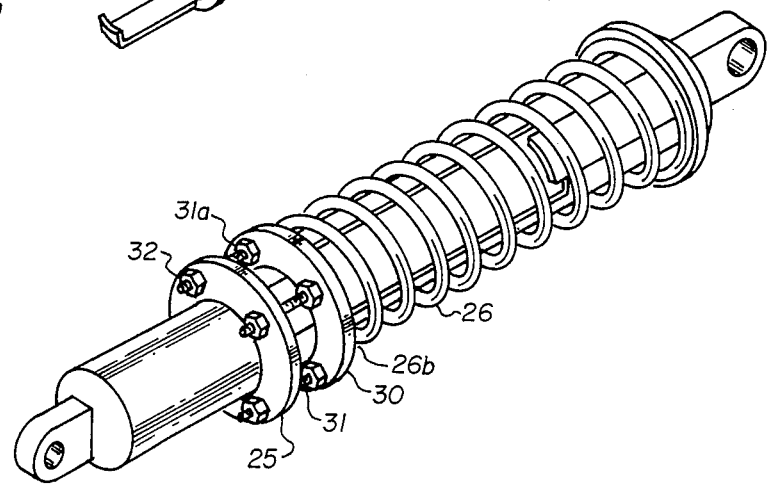
FIG. 6 is a view like that of FIG. 1 only showing a spring compression ring arranged between a retaining clip and the coil spring end with bolts shown turned into tapped holes in a retaining clip flange, the bolt head ends shown engaging the ring such that, with bolt turning the spring compression ring will be moved away from or towards that retainer clip flange for adjusting the compression force exerted by the coil spring.

FIG. 6 is provided to illustrate an example of an arrangement for adjusting the compressive loading of spring 26 for supporting an anticipated vehicle towing weight. Shown therein, a spring compression ring 30 is included with the shock absorber 10 assembly that is arranged between the coil spring end 26b and flange 25 of the retaining clip 19. In this configuration, prior to assembly, the flange 25 is holed and tapped, or a nut 32 is welded to the flange side in alignment with said hole opposite to the opposing retaining clip 18 to receive a bolt 31 turned therethrough. A head 31a of bolt 31 is shown arranged to engage the face of spring compression ring 30 opposite to the coil spring end engaging face thereof. So arranged, by turning the bolt 31 at head 31a the distance from the flange 25 to spring compression ring 30 is adjusted to, in turn, compress or extend coil spring 26 so as to adjust the compressive loading exerted by that coil spring. Of course, other arrangements for providing compressive loading on coil spring 26 in the assembly of the shock absorber 10 can be included within the scope of this disclosure.

While preferred embodiments of the present invention in a dampening shock absorber have been shown and described herein, it should be understood that this disclosure is made by way of example only and that variations to the structure of the invention and to its use are possible without departing from the subject matter coming within the scope of the following claims, which claims I regard as my invention.

I claim:

1. A dampening shock abosrber or buffer comprising, an inner sleeve that is closed across one end and includes a draw bar means extending therefrom, which inner sleeve includes a pair of spaced apart guide rings secured at intervals therearound; an annular sleeve for telescoping over said inner sleeve open end that is closed across its opposite end and includes a draw bar means extending therefrom; means extending longitudinally between the open ends of said inner and annular sleeves for providing resistance against said inner sleeve telescoping into said annular sleeve; at least one pair of longitudinal slots formed in said annular sleeve to be alike and are located across from one another, each having a length that is equal to the interval between the inner edges of said inner sleeve guide rings, and the ends of each said slots are parallel and aligned; a pair of retaining clip means each for fitting in sliding engagement around said annular sleeve to face one another, each retaining clip means including an outwardly extending flange therearound and a finger means extending inwardly of said retaining clip means for fitting and travel in a respective annular sleeve slot between the ends said slots, said finger means projecting towards one another from each retaining clip means flange, the finger means ends to engage and extend inwardly beyond said longitudinal slot end; means for biasing apart said retaining clip means.

2. A dampening shock absorber or buffer as recited in claim 1, wherein the means for providing resistance to travel of the inner sleeve into the annular sleeve is a rod that is secured centrally to extend longitudinally from the annular sleeve closed end into said inner sleeve, which rod includes a piston secured across the end thereof within the inner sleeve; and seal means arranged with said piston to seal against the interior wall of said inner sleeve.

3. A dampening shock absorber or buffer as recited in claim 1, wherein the retaining clip means each consists of an encircling flange that is at a right angle outwardly to, and is in sliding engagement over the annular sleeve, and includes slide portions that extend at intervals from said flange for travel over the annular sleeve slot, which slide portions extend at a right angle from said flange and each terminates at said finger means which is in the form of a finger downturned at a right angle from said slide portion to engage one of said slot ends and extend therebeyond to further engage an inner edge of a guide ring that is secured around the inner sleeve.

4. A dampening shock absorber to buffer as recited in claim 3, wherein the means for biasing the retaining clips apart is a coil spring that is telescoped over the annular sleeve, between the retaining clip flanges.

5. A dampening shock absorber or buffer as recited in claim 4, further including means for adjusting the biasing force exerted by the coil spring against the retaining clip flanges.

6. A dampening shock absorber or buffer as recited in claim 5, wherein the means for adjusting the biasing force of the coil spring is a spring compression ring that is fitted between the coil spring end and one of the retaining clip flanges, which retaining clip flange is holed appropriately therethrough to receive a bar means fitted therethrough to engage said spring compression ring face opposite to said coil spring end for uniformly moving that spring compression ring against said coil spring end.

7. A dampening shock absorber or buffer as recited in claim 6, wherein the hole formed through said retaining clip flange is tapped or a nut means having a threaded opening is aligned with and secured to that flange face over said hole to receive a bolt means turned therethrough, which bolt means includes a head end for engagement with said spring compressive ring.

8. A dampening shock absorber or buffer as recited in claim 1, further including means for adjusting the biasing force urging the retaining clips apart.

* * * * *